No. 793,962. PATENTED JULY 4, 1905.
H. G. ROTH.
COVER FOR JARS OR SIMILAR VESSELS.
APPLICATION FILED DEC. 8, 1904.

Witnesses
A. H. Opsahl.
E. W. Jeppesen.

Inventor.
Henry G. Roth.
By his Attorneys.
Williamson Merchant

No. 793,962.

Patented July 4, 1905.

UNITED STATES PATENT OFFICE.

HENRY G. ROTH, OF MINNEAPOLIS, MINNESOTA.

COVER FOR JARS OR SIMILAR VESSELS.

SPECIFICATION forming part of Letters Patent No. 793,962, dated July 4, 1905.

Application filed December 8, 1904. Serial No. 235,923.

*To all whom it may concern:*

Be it known that I, HENRY G. ROTH, a citizen of the United States, residing at Minneapolis, in the county of Hennepin and State of Minnesota, have invented certain new and useful Improvements in Covers for Jars or Similar Vessels; and I do hereby declare the following to be a full, clear, and exact description of the invention, such as will enable others skilled in the art to which it appertains to make and use the same.

My invention relates to detachable covers for jars, pails, barrels, &c., and has for its object to improve the same in the several particulars hereinafter noted.

The invention consists of the novel devices and combinations of devices and arrangement of parts hereinafter described, and defined in the claims.

In the accompanying drawings, which illustrate the invention, like characters indicate like parts throughout the several views.

Figure 1:
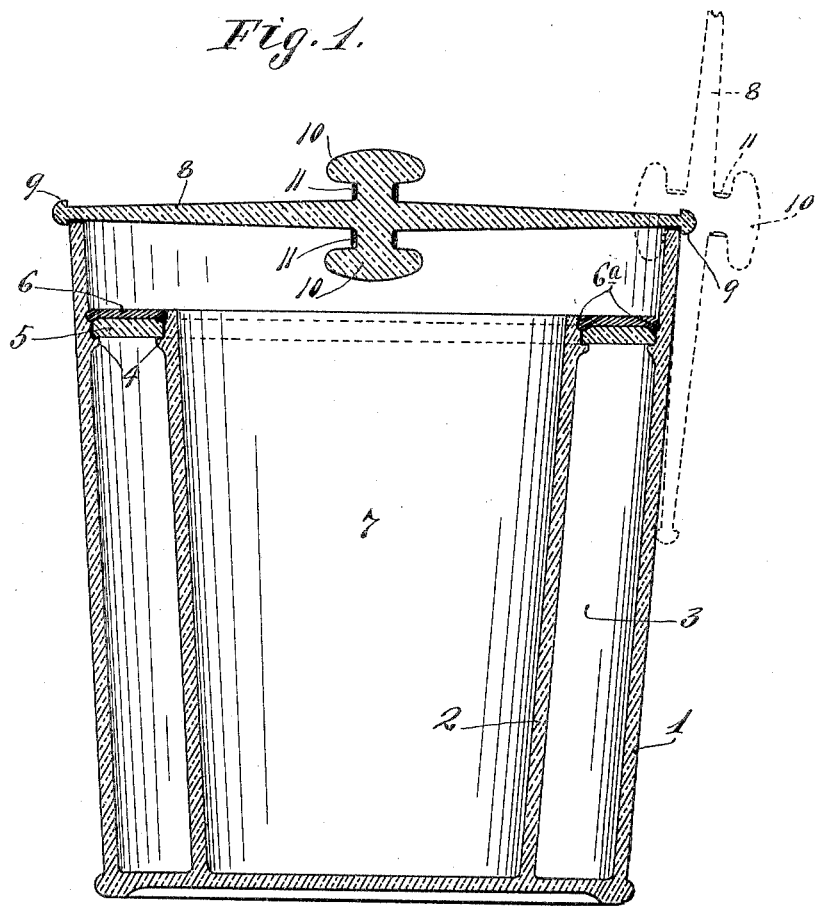
Figure 2:
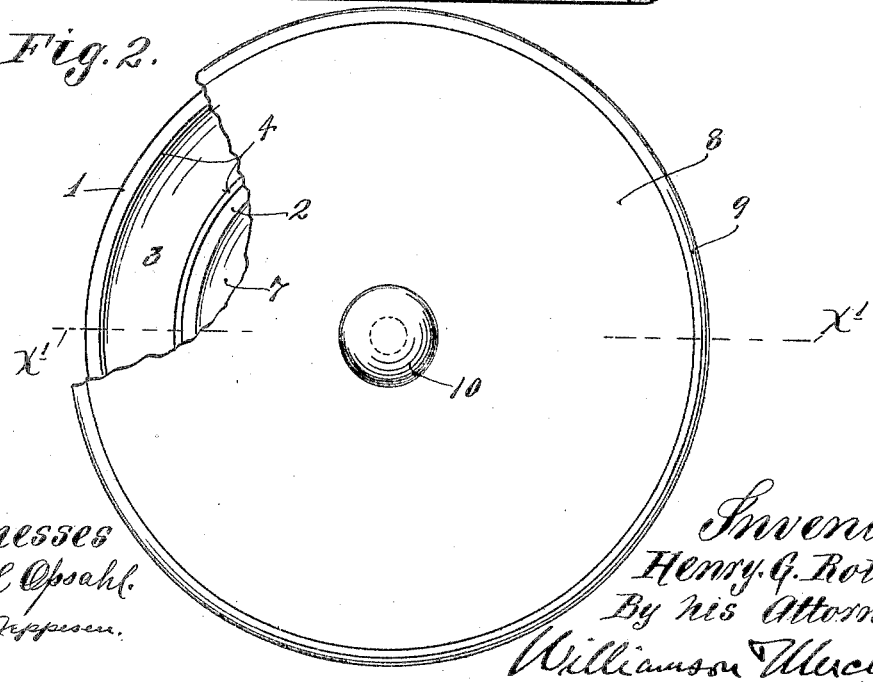

Figure 1 is a vertical section taken through a jar having a cover designed in accordance with my invention; and Fig. 2 is a plan view of the parts shown in Fig. 1, a portion of the cover being broken away.

The numeral 1 indicates a jar, as shown, having an inner wall 2 formed integral with the bottom of the jar, all parts of said jar being preferably, but not necessarily, constructed of glass. The annular display-compartment 3, formed between the walls 1 and 2, is preferably closed by an annular cover 5, supported by ledges 4 on the walls of said jar. The numeral 6 indicates paraffin or sealing material which, as shown, is melted and run into place on top of the annular cover 5 to hermetically seal the said display-compartment 3. As shown, the outer and inner walls of the jar are formed with annular grooves 6$^a$, into which the paraffin 6 is run at the edges of the paraffin coating. This jar involves novel features of construction not herein claimed, but which are claimed broadly in my application, Serial No. 235,924, filed December 8, 1904, entitled "Retail display-jars." The numeral 7 indicates the main compartment of the jar.

To fit the outer flange of the jar at its upper edge and to close the jar, a disk-like cover or lid 8 is provided. This cover 8 is provided with a marginal bead 9, that preferably projects both upward and dowdward and is adapted to fit around the upper edge of the outer flange of the jar. At the center of the cover 8, on each side thereof, is a headed trunnion 10, around the neck of which is placed a pliable ring 11, of rubber, leather, or similar material. The cover shown is a reversible cover, and the upturned headed trunnion is adapted to be used as a knob by which to lift the cover. The downturned trunnion when the cover is slid to one side and turned upward, as shown by dotted lines in Fig. 1, is adapted to run upon the upper edge of the outer wall of the jar, and the head of said trunnion engages the inner surface of said outer wall and securely holds the cover against accidental displacement. As is evident, when the cover is turned upward, as shown by dotted lines in Fig. 1, its center of gravity is outward of the trunnion which supports the cover on the jar, so that the said cover will be held in its opened position by gravity and may be caused to travel or run upon the rim or upper edge of the outer wall of said jar. The pliable ring 11 affords a cushion between the trunnion or neck and the rim of the jar. The cover and its headed trunnions or necks are preferably integrally formed of glass, but may be constructed of any other materials—such, for instance, as clay, or even of wood. The cover while preferably made reversible by the provision of headed trunnions on both sides thereof will in some instances be made with such headed trunnion on one side only.

From what has been said it will be understood that the device described is capable of modification within the scope of my invention as herein set forth and claimed.

In order to adapt the headed trunnions to run upon the rim of the jar or other vessel, the shank or neck portions thereof must of course be long enough to permit the rim of the jar to enter between the body of the cover and the head of the trunnion.

What I claim, and desire to secure by Let- ters Patent of the United States, is as follows:

1. The combination with a jar 1, of a cover 8 having a marginal bead 9 projecting at both faces thereof, and having alined headed trunnions 10 projecting from its opposite faces and engageable with the rim of the jar, to support said cover in an open position, substantially as described.

2. The combination with a jar, of a cover therefor having at its central portion a headed trunnion engageable with the rim of said jar, to support said cover in an open position, and a pliable ring surrounding the shank of said trunnion and serving as a cushion, substantially as described.

3. The combination with a jar, of a cover having at its central portion headed trunnions projecting from the opposite faces thereof and engageable with the rim of said jar and adapted to interlock therewith and to run thereupon, substantially as described.

In testimony whereof I affix my signature in presence of two witnesses.

HENRY G. ROTH.

Witnesses:
HARRY D. KILGORE,
F. D. MERCHANT.